US008725917B2

(12) United States Patent
Tsai et al.

(10) Patent No.: US 8,725,917 B2
(45) Date of Patent: May 13, 2014

(54) CHIP AND COMPUTER SYSTEM

(75) Inventors: Hsi-Jung Tsai, Hsinchu (TW); Chi-Hung Lin, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 374 days.

(21) Appl. No.: 13/193,622

(22) Filed: Jul. 29, 2011

(65) Prior Publication Data

US 2012/0068985 A1 Mar. 22, 2012

(30) Foreign Application Priority Data

Sep. 16, 2010 (CN) .......................... 2010 1 0287168

(51) Int. Cl.
*G06F 13/12* (2006.01)
*G06F 3/038* (2013.01)

(52) U.S. Cl.
USPC ............................................ 710/65; 345/211

(58) Field of Classification Search
None
See application file for complete search history.

(56) References Cited

U.S. PATENT DOCUMENTS

| | | | |
|---|---|---|---|
| 5,990,940 A | 11/1999 | Hashimoto et al. | |
| 6,037,978 A | 3/2000 | Kim | |
| 6,147,682 A * | 11/2000 | Kim | 345/211 |
| 6,845,277 B1 | 1/2005 | Michelet et al. | |
| 2006/0232576 A1* | 10/2006 | Evanicky et al. | 345/207 |
| 2007/0004270 A1 | 1/2007 | Kim et al. | |
| 2007/0168763 A1 | 7/2007 | Sauber et al. | |
| 2010/0037079 A1 | 2/2010 | Nieh et al. | |
| 2012/0218320 A1* | 8/2012 | Evanicky et al. | 345/690 |

FOREIGN PATENT DOCUMENTS

| | | |
|---|---|---|
| TW | 561334 B | 11/2003 |
| TW | 200825726 | 6/2008 |
| TW | 200917018 | 4/2009 |
| TW | 200921367 | 5/2009 |
| TW | 200949700 | 12/2009 |
| TW | 200951708 A | 12/2009 |
| WO | WO2010024626 A2 | 3/2010 |

* cited by examiner

*Primary Examiner* — Hyun Nam
(74) *Attorney, Agent, or Firm* — CKC & Partners Co., Ltd.

(57) ABSTRACT

A computer system is provided. The computer system comprises system and peripheral hardware devices, a display device and a chip. The display device comprises a display panel and an on-screen display (OSD) control module. The chip comprises a computer system environment information monitoring module, a control connection interface and a control module. The computer system environment information monitoring module monitors computer system environment information according to the system and peripheral hardware devices. The control connection interface is electrically connected to the OSD control module. The control module is electrically connected to the computer system environment information monitoring module and the control connection interface to control the OSD control module through the control connection interface according to the computer system environment information to further control the display function of the display panel.

23 Claims, 4 Drawing Sheets

CHIP AND COMPUTER SYSTEM

RELATED APPLICATIONS

This application claims priority to Chinese Application Serial Number 201010287168.7, filed Sep. 16, 2010, which is herein incorporated by reference.

BACKGROUND

1. Technical Field

The present disclosure relates to an electronic device. More particularly, the present disclosure relates to a computer system and a chip having a computer system environment information monitoring module.

2. Description of Related Art

Input/output interfaces are the device by which users interact with a computer system. The computer system often makes use of a screen as an output device to present the information to the user. Usually, a display card, such as a video card, a graphics card or a graphics-accelerator card, is needed to process the information to generate output images on the screen. However, the users are not able to receive the information when the display card malfunctions or when the information is generated before the activation of the display card. Thus, the users cannot figure out the status of the computer when the above situations occur.

SUMMARY

An aspect of the present disclosure is to provide a chip adapted in a computer system. The chip comprises a computer system environment information monitoring module, a control connection interface and a control module. The computer system environment information monitoring module monitors a computer system environment information of the computer system. The control connection interface is electrically connected to an OSD (on-screen display) control module of the computer system. The control module is electrically connected to the computer system environment information monitoring module and the control connection interface to control the OSD control module through the control connection interface according to the computer system environment information to further control a display function of a display panel.

Another aspect of the present disclosure is to provide a computer system. The computer system comprises a plurality of system and peripheral hardware devices, a display device and a chip. The display device comprises a display panel and an OSD control module for controlling a display function of the display panel. The chip comprises a computer system environment information monitoring module, a control connection interface and a control module. The computer system environment information monitoring module monitors a computer system environment information of the computer system according to the system and peripheral hardware devices. The control connection interface is electrically connected to the OSD control module. The control module is electrically connected to the computer system environment information monitoring module and the control connection interface to control the OSD control module through the control connection interface according to the computer system environment information to further control the display function of the display panel.

Yet another aspect of the present disclosure is to provide a chip adapted in a computer system. The chip comprises a control connection interface and a control module. The control connection interface is electrically connected to an OSD (on-screen display) control module of the computer system. The control module is electrically connected to the control connection interface and at least one system and peripheral hardware device. The control module receives an input command from the OSD control module through the control connection interface to control the system and peripheral hardware device according to the input command It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

In the following description, several specific details are presented to provide a thorough understanding of the embodiments of the present invention. One skilled in the relevant art will recognize, however, that the present invention can be practiced without one or more of the specific details, or in combination with or with other components, etc. In other instances, well-known implementations or operations are not shown or described in detail to avoid obscuring aspects of various embodiments of the present invention.

The terms used in this specification generally have their ordinary meanings in the art and in the specific context where each term is used. The use of examples anywhere in this specification, including examples of any terms discussed herein, is illustrative only, and in no way limits the scope and meaning of the invention or of any exemplified term. Likewise, the present invention is not limited to various embodiments given in this specification.

As used, herein, the terms "comprising," "including," "having," "containing," "involving," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present invention. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

Figure 1:
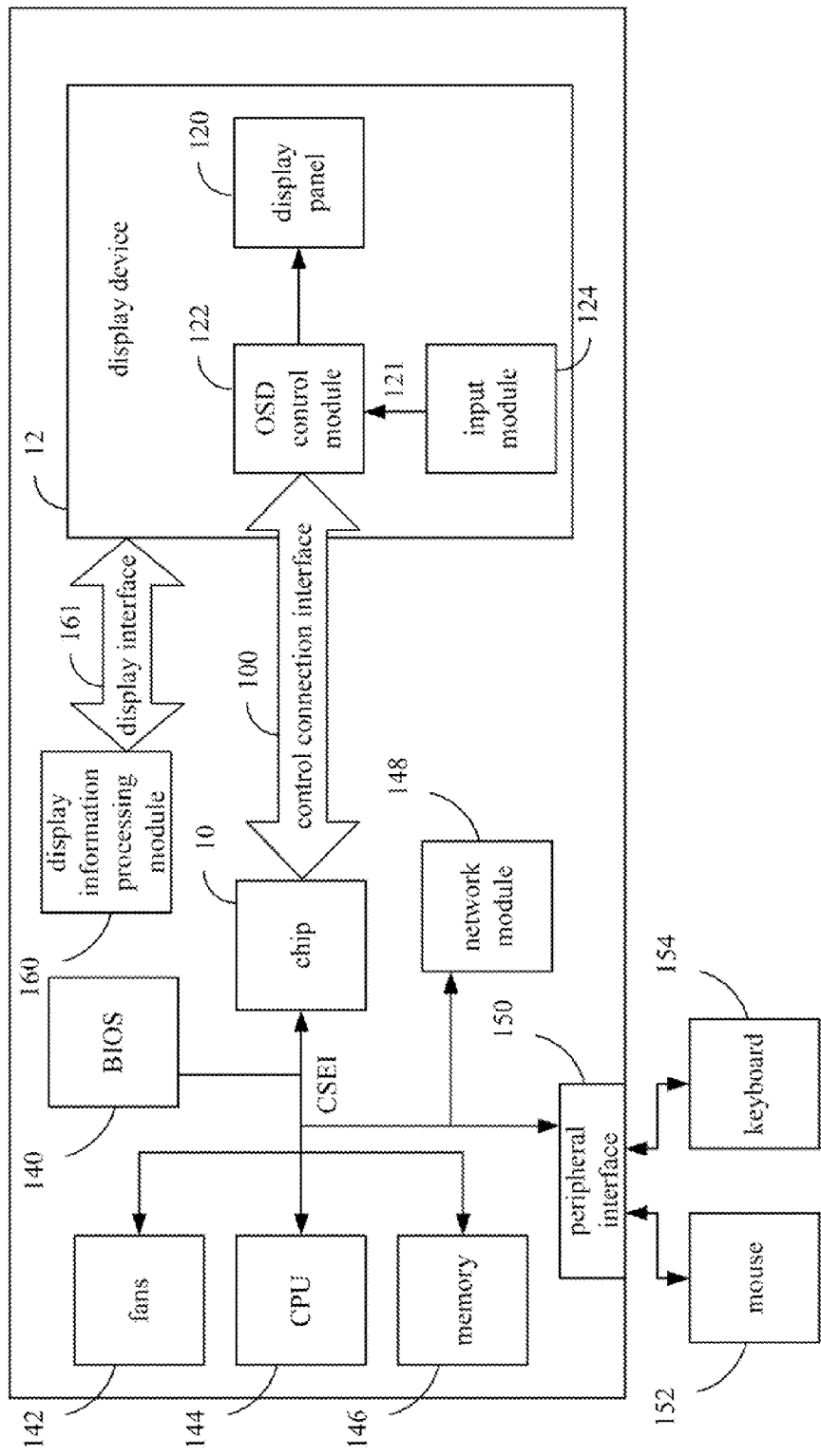
FIG. 1 is a block diagram of a computer system of an embodiment of the present disclosure.

Please refer to FIG. 1. FIG. 1 is a block diagram of a computer system 1 of an embodiment of the present disclosure. The computer system 1 comprises a chip 10, a display device 12 and a plurality of system and peripheral hardware devices.

The display device 12 comprises a display panel 120 and an OSD control module 122 for controlling a display function of the display panel 120. An input module 124, such as the buttons disposed on the display device 12, can be used to activate the OSD control module 122 to perform the controlling mechanism. The OSD control module 122 is able to display the basic information of the display device 12 and provide an adjusting interface for the display device 12. For example, the user can activate the OSD control module 122 to show a function table on the display panel 120 by using the input module 124 to adjust, for example, the brightness, the contrast or the frame position of the display panel 120. In different embodiments, the OSD control module 122 can be integrated with parts of the modules such as LCD controller, scalar or power control module into a single monitor IC or into a number of different chips.

The system and peripheral hardware devices of the computer system 1 may comprise a BIOS 140, fans 142, a CPU 144, a memory 146, a network module 148, devices connected to the computer system 1 through the peripheral interface 150 such as a mouse 152 or keyboard 154 and a display information processing module 160.

The display information processing module 160 can be a display card such as a VGA (video graphics array) card or can be a display card with other specification (e.g. SVGA, XGA, SXGA, etc.). When the BIOS 140 of the computer system 1 finishes the initialization of the devices in the computer system 1, the user can operate the computer system 1 by the computer operation system. The information of the computer system 1 can be transmitted to the display device 12 by the display information processing module 160 through the display interface 161 to be displayed on the display panel 120.

Figure 2:
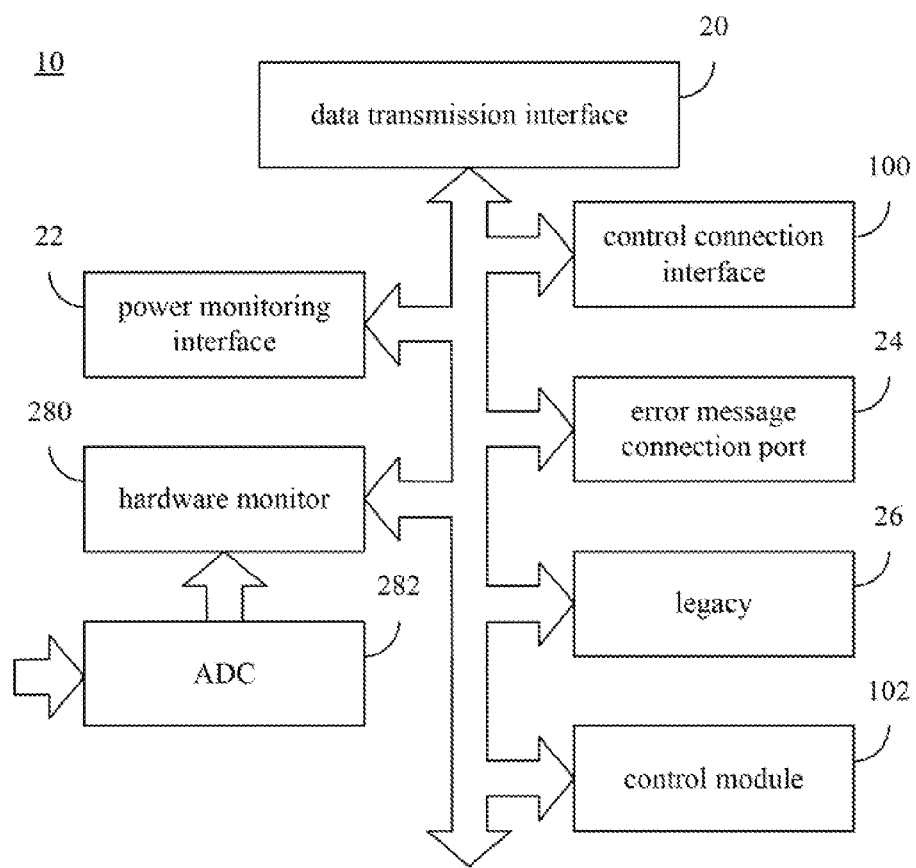
FIG. 2 is a detailed block diagram of the chip depicted in FIG. 1.

Please refer to FIG. 2. FIG. 2 is a detailed block diagram of the chip 10. The chip 10 in the present embodiment is an SIO (super input/output) chip.

The chip 10 comprises a computer system environment information monitoring module, a control connection interface 100 and a control module 102. In the present embodiment, the computer system environment information monitoring module can be a data transmission interface 20, a power monitoring interface 22, an error message connection port 24, a legacy 26, a hardware monitor 280, an ADC (Analog to Digital Converter) 282 or a combination of the above function blocks (e.g. combination of two or more function blocks).

The data transmission interface 20 can be an LPC (low pin count) interface in an embodiment. The data transmission interface 20 and the legacy 26 can replace the conventional ISA (Industry Standard Architecture) transmission interface to provide a faster data transmission for part of the I/O devices, whereas the data transmission interface 20 further communicates with the south bridge chipset (not shown) of the computer system 1. The power monitoring interface 22 can be an ACPI (Advanced Configuration and Power Interface) to control and manage the power of the computer system 1. For example, the power monitoring interface 22 can manage the power-on sequence and power-off sequence of the devices and provide a power management when the computer system is not turned off properly.

The error message connection port 24 can be Port 80 in an embodiment to report the error message when a POST (Power-on Self Test) process is performed by the BIOS 140 shown in FIG. 1 during the initialization of the computer system 1. The ADC 282 is connected to a multiple of sensors (not shown) in the computer system 1, wherein the sensors can sense the hardware information such as, but not limited to, the temperature of the CPU 144, the speed of the fans 142 and the temperature and the voltage of the modules in the computer system 1. The ADC 282 converts the values sensed by the sensors into a specific format and transmits the data to the hardware monitor 280.

Consequently, the computer system environment information monitoring module comprising the data transmission interface 20, the power monitoring interface 22, the error message connection port 24, the legacy 26, the hardware monitor 280, the ADC 282 or a combination of the above function blocks can monitor a computer system environment information (abbreviated as CSEI in FIG. 1) of the computer system 1 according to the system and peripheral hardware devices described above.

For example, the computer system environment information retrieved by the system and peripheral hardware devices can be (but not limited to) the power information from the power monitoring interface 22, the system and peripheral hardware device self test result information from the error message connection port 24, the hardware system information received to the hardware monitor 280 from the ADC 282 according to the sensors such as the CPU information, the temperature information, the voltage information, the fan speed information and the information received to the data transmission interface 20 from the south bridge chipset such as the network ID, the CPU ID, the LAN connection status information or a combination of the above. It's noticed that, in an embodiment, the system and peripheral hardware device self test result information can be transmitted from the data transmission interface 20 directly to the control module 102 without the use of the error message connection port 24.

In other embodiments, the computer system environment information monitoring module can include other modules or can retrieve different computer system environment information.

The control connection interface 100 is electrically connected to the OSD control module 122. In an embodiment, the control connection interface 100 is a SMBus (System Management Bus) to communicate with the OSD control module 122. In an embodiment, the chip 10 can act as a master and the OSD control module 122 can act as a slave to communicate through the control connection interface 100. In other embodiments, other formats of bus interface such as SPI or I$^2$C can be adapted to perform the communication if a proper design of the commands is accomplished.

The control module 102 is electrically connected to the computer system environment information monitoring module and the control connection interface 100 to control the OSD control module 122 through the control connection interface 100 according to the computer system environment information described above.

The control module 102 can control the OSD control module 122 according to the computer system environment information to control a display function of the display panel 120. In an embodiment, the control module 102 can transmit the computer system environment information to the OSD controller 122 such that the content of the computer system environment information can be displayed on the display panel 120.

The system information is not able to be displayed by the display information processing module 160 and the display interface 161 when the operation system or the display information processing module 160 of the computer system 1 is unable to be activated or is not activated yet, or when the display interface 161 is disconnected. Furthermore, when there is an error situation in the POST process performed by the BIOS 140 during the initialization of the computer system 1, the error message needs to be shown by additional LEDs on the motherboard, and the debug process has to be performed by an additional debug card, which are quite inconvenient.

The control module 102 in the present disclosure is able to control the OSD control module 122 through the control connection interface 100 to display the content of the computer system environment information monitored by the computer system environment information monitoring module of the chip 10 on the display panel 120. Therefore, the user can understand the status of the system or perform debug procedure according to the computer system environment information displayed by the OSD control module 122 on the display device 12 without any additional external module.

In an embodiment, the control module is able to control the OSD control module 122 to display a part of or all the content of the computer system environment information on the display panel 120 according to the input command 121 from the input module 124. The OSD control module 122 can display a function table to let the user determine the part of the computer system environment information to be displayed.

In another embodiment, the control module 102 controls the OSD control module 122 according to the computer system environment information to control a display state of the display panel 120, wherein the display state comprises a backlight brightness, a contrast, a color-related parameter, a frame position or a combination of the above. For example, when the control module 102 determines that the computer system 1 idles over a predetermined time period according to the computer system environment information, the control module 102 can lower the backlight brightness of the display panel 120 through the OSD control module 122 to save the power.

In yet another embodiment, the control module 102 controls a power-control module (not shown) of the display panel 120 through the OSD control module 122 according to the computer system environment information such that the power-control module lowers or turns off the power of the display panel 120 when the display panel 120 is in a standby mode and restores the power of the display panel 120 when the display panel 120 is back to a work mode.

In another embodiment, the control module 102 receives the input command 121 from the OSD control module 122 through the control connection interface 100 to accomplish a bi-directional communication and control mechanism between the chip 10 and the OSD control module 122.

When the peripheral I/O devices such as the mouse 152 or keyboard 154 cannot work properly, the control module 102 can control these peripheral I/O devices according to the input command 121. For example, the control module 102 can perform a debug process or a power-off control on the computer system 1 according to the input command 121. The control module 102 can also turn off the computer system 1 through the power monitoring interface 22 according to the input command 121. On the other hand, when the display panel 120 can not show any information due to the malfunction of the display information processing module 160 and the display interface 161, the control module 102 can also control the computer system environment information monitoring module to retrieve related information according to the input command 121 to further send the related information to the OSD control module 122 through the control connection interface 100 to display the related information on the display panel 120. Thus, the bi-directional communication mechanism allows the chip 10 controlling the computer system 1 according to the input command 121 from the display device 12 when the I/O devices of the computer system 1 malfunction but the display device 12 operates as normal.

Figure 3:
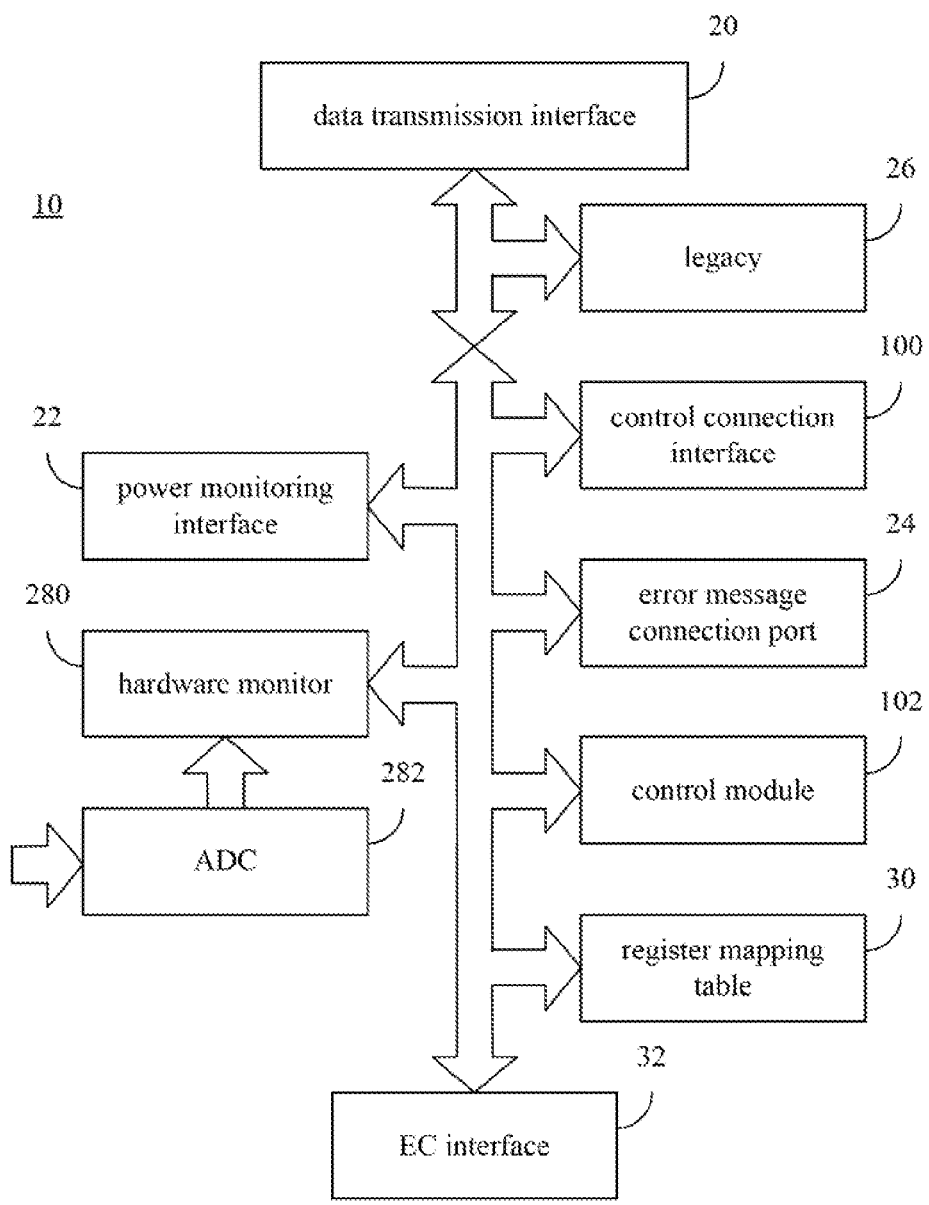
FIG. 3 is detailed block diagram of the chip in another embodiment of the present disclosure.

Please refer to FIG. 3. FIG. 3 is detailed block diagram of the chip 10 in another embodiment of the present disclosure. The chip 10 in the present embodiment can be an EC (embedded controller) chip.

In the present embodiment, the basic architecture of the chip 10 shown in FIG. 3 is similar to the chip shown in FIG. 2. The chip 10 shown in FIG. 3 comprises the control connection interface 100, the control module 102, the data transmission interface 20, the power monitoring interface 22, the error message connection port 24, the legacy 26, the hardware monitor 280 and the ADC (Analog to Digital Converter) 282. However, the chip 10 in the present embodiment further comprises a register mapping table 30 and an EC interface 32. In the present embodiment, the computer system environment information monitoring module can be the blocks (interface or module) described above or any combination of them.

The difference between the chip 10 with the EC form and the chip 10 with the SIO form is that the chip 10 with the SIO form has a specific circuit designed for implementing the computer system environment information monitoring module or other modules, whereas the computer system environment information monitoring module or other modules in the chip 10 with the EC form is implemented by storing a firmware to control the multipliers, the adders, the registers and the GPIOs (General Purpose I/O) in the chip 10 to perform the functions of the computer system environment information monitoring module or other modules. Though in FIG. 3 these modules are each shown as an individual block, part of the modules are not implemented by specific circuits but are implement by controlling the multipliers, the adders, the registers and the GPIOs. Consequently, the register mapping table 30 in the chip 10 is to make the registers in the chip 10 accessible. The EC interface 32 further provides a communication interface for the chips 10 to communicate with the data transmission interface 20 and the legacy 26. Through the control of the multipliers, the adders, the registers and the GPIOs, the chip 10 in the present embodiment can also be adapted in the computer system 1 and perform the functions described in the previous embodiment. In other embodiments, the kinds of chips other than EC and SIO may be adapted in the computer system 1 as well.

It's noticed that the computer system 1 can be an AIO (all in one) form as depicted in FIG. 1. In other words, the chip 10, the display device 12 and the devices such as the BIOS 140, CPU 144 and memory 146 are formed on the same circuit board. The control connection interface 100 between the chip 10 (or control module 102 located in chip 10) and the OSD control module 122 can be formed on the circuit board directly.

Figure 4:
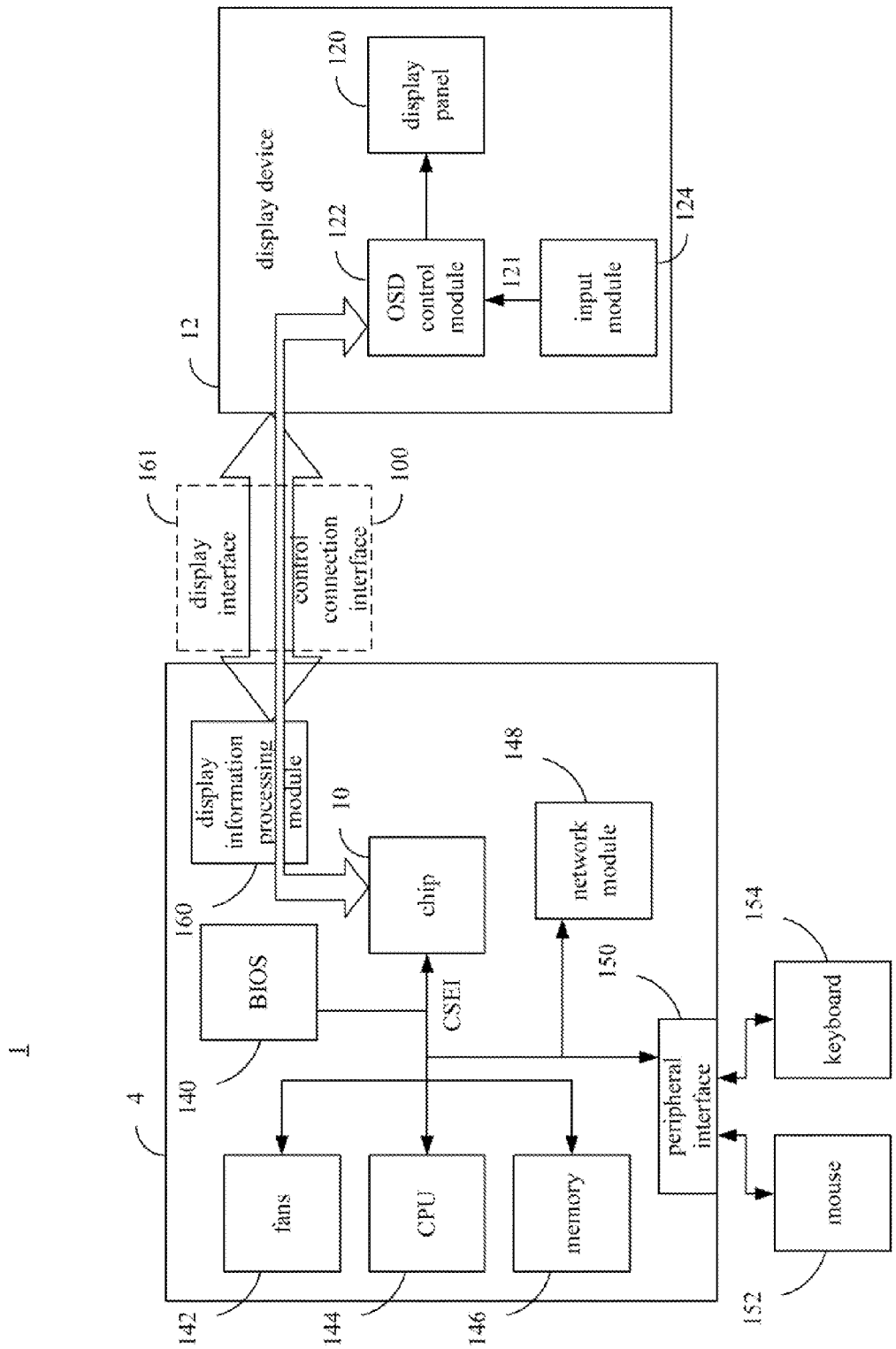
FIG. 4 is the block diagram of the computer system in another embodiment of the present disclosure.

Please refer to FIG. 4. FIG. 4 is the block diagram of the computer system 1 in another embodiment of the present disclosure. In the present embodiment, the computer system 1 is a desktop computer or a notebook computer comprising a host 4. The chip 10 and the system and peripheral hardware devices are disposed in the host 4, whereas the display device 12 is independent of the host 4. Take the desktop computer for example, a communication wire is needed to form the display interface 161 between the display information processing module 160 and the display device 12. The control connection interface 100 between the chip 10 (or control module 102 located therein) and the OSD control module 122 can be integrated with the display interface 161 in the same communication wire to accomplish the bi-directional communication and control mechanism.

The advantage of the chip and the computer system of the present disclosure is that the chip is able to control the operation of the display panel by controlling the OSD control module through the connection between the chip and the OSD control module according to the computer system environment information.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A chip adapted in a computer system, comprising:
a computer system environment information monitoring module for monitoring a computer system environment information of the computer system;
a control connection interface electrically connected to an OSD (on-screen display) control module of the computer system; and
a control module electrically connected to the computer system environment information monitoring module and the control connection interface to control the OSD control module through the control connection interface according to the computer system environment information to further control a display function of a display panel.

2. The chip of claim 1, wherein the computer system environment information is a hardware system information, a power information, a system and peripheral hardware device self test result information or a combination of the above.

3. The chip of claim 2, wherein the computer system further comprises a BIOS (basic input/output system), the system and peripheral hardware device self test result information is a result of a POST (power-on self test) process of the BIOS.

4. The chip of claim 1, wherein the hardware system information is a CPU information, a temperature information, a voltage information, a fan speed information, a network ID, a CPU ID, a LAN connection status information or a combination of the above.

5. The chip of claim 1, wherein the control module controls the OSD control module according to the computer system environment information to display a content of the computer system environment information on the display panel.

6. The chip of claim 1, wherein the control module controls the OSD control module according to the computer system environment information to control a display state of the display panel, wherein the display state comprises a backlight brightness, a contrast, a color-related parameter, a frame position or a combination of the above.

7. The chip of claim 1, wherein the control module controls a power-control module of the display panel through the OSD control module according to the computer system environment information such that the power-control module lowers or turns off the power of the display panel when the display panel is in a standby mode, and restores the power of the display panel when the display panel is back to a work mode.

8. The chip of claim 1, wherein the control module receives an input command from the OSD control module through the control connection interface to control a plurality of system and peripheral hardware devices according to the input command.

9. The chip of claim 8, wherein the control module performs a debug process or a power-off control on the computer system according to the input command.

10. The chip of claim 8, wherein the control module retrieves related information from the computer system environment information monitoring module according to the input command when a display interface of the computer system is unable to operate such that the OSD control module displays the related information on the display panel.

11. The chip of claim 1, wherein the chip is a super input/output (SIO) chip or an embedded controller (EC) chip.

12. A computer system comprising:
a plurality of system and peripheral hardware devices;
a display device comprising:
a display panel; and
an OSD control module for controlling a display function of the display panel;
a chip comprising:
a computer system environment information monitoring module for monitoring a computer system environment information of the computer system according to the system and peripheral hardware devices;
a control connection interface electrically connected to the OSD control module; and
a control module electrically connected to the computer system environment information monitoring module and the control connection interface to control the OSD control module through the control connection interface according to the computer system environment information to further control the display function of the display panel.

13. The computer system of claim 12, wherein the computer system environment information is a hardware system information, a power information, a system and peripheral hardware device self test result information or a combination of the above.

14. The computer system of claim 13, wherein the computer system further comprises a BIOS, the system and peripheral hardware device self test result information is a result of a POST process of the BIOS.

15. The computer system of claim 12, wherein the hardware system information is a CPU information, a temperature information, a voltage information, a fan speed information, a network ID, a CPU ID, a LAN connection status information or a combination of the above.

16. The computer system of claim 12, wherein the control module controls the OSD control module according to the computer system environment information to display a content of the computer system environment information on the display panel.

17. The computer system of claim 12, wherein the control module controls the OSD control module according to the computer system environment information to control a display state of the display panel, wherein the display state comprises a backlight brightness, a contrast, a color-related parameter, a frame position or a combination of the above.

18. The computer system of claim 12, wherein the control module controls a power-control module of the display panel through the OSD control module according to the computer system environment information such that the power-control module lowers or turns off the power of the display panel when the display panel is in a standby mode and restores the power of he is display panel when the display panel is back to a work mode.

19. The computer system of claim 12, wherein display device further comprises an input module for receiving an input command and the OSD control module further transfers the input command to the control module such that the control module receives the input command from the OSD control module through the control connection interface to control the system and peripheral hardware devices according to the input command.

20. The computer system of claim 19, wherein the control module performs a debug process or a power-off control on the computer system according to the input command.

21. The computer system of claim 19, wherein the control module retrieves related information from the computer system environment information monitoring module according to the input command when a display interface of the computer system is unable to operate such that the OSD control module displays the related information on the display panel.

22. The computer system of claim 12, wherein the chip is a super input/output (SIO) chip or an embedded controller (EC) chip.

23. A chip adapted in a computer system, comprising:
 a control connection interface electrically connected to an OSD (on-screen display) control module of the computer system; and
 a control module electrically connected to the control connection interface and at least one system and peripheral hardware device, wherein the control module receives an input command from the OSD control module through the control connection interface to control the system and peripheral hardware device according to the input command.

\* \* \* \* \*